(12) United States Patent
Marangappanavar et al.

(10) Patent No.: US 9,992,254 B2
(45) Date of Patent: Jun. 5, 2018

(54) METHOD AND SYSTEM OF PROVIDING A WEB FEED IN A UNIFORM RESOURCE IDENTIFIER

(71) Applicant: Samsung Electronics Co., Ltd., Suwon-si, Gyeonggi-do (KR)

(72) Inventors: Vinodkumar Laxmappa Marangappanavar, Bangalore (IN); Joy Bose, Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 14/972,718

(22) Filed: Dec. 17, 2015

(65) Prior Publication Data

US 2016/0191603 A1    Jun. 30, 2016

(30) Foreign Application Priority Data

Dec. 29, 2014    (IN) ........................... 6668/CHE/2014
Nov. 16, 2015    (KR) ........................ 10-2015-0160670

(51) Int. Cl.
*H04L 29/08*     (2006.01)
*H04B 1/3827*   (2015.01)

(52) U.S. Cl.
CPC ............. *H04L 67/02* (2013.01); *H04B 1/385* (2013.01); *H04L 67/26* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,865,511 B2* | 1/2011 | Kahn | G06F 17/3089 707/758 |
| 8,122,360 B2* | 2/2012 | Harinarayan | G06F 17/30867 715/738 |
| 2008/0201449 A1* | 8/2008 | Huang | H04L 67/06 709/218 |
| 2010/0306317 A1* | 12/2010 | Serr | G06Q 10/107 709/205 |
| 2011/0016196 A1* | 1/2011 | Martin-Cocher | H04W 4/00 709/219 |
| 2012/0194976 A1* | 8/2012 | Golko | G06F 1/163 361/679.01 |
| 2014/0372500 A1* | 12/2014 | Lin | H04L 67/1097 709/201 |
| 2016/0103917 A1* | 4/2016 | Talmor | G06Q 10/067 707/738 |

* cited by examiner

*Primary Examiner* — Thomas J Dailey

(74) *Attorney, Agent, or Firm* — Jefferson IP Law, LLP

(57) ABSTRACT

A method and a system of providing a web feed in a uniform resource identifier (URI) are provided. The method includes obtaining, by a processing unit, a plurality of the URIs from at least one data source in a primary electronic device, automatically fetching, by a parsing unit, at least one web feed, corresponding to at least one URI of the plurality of URIs, from a server, and providing the at least one fetched web feed.

18 Claims, 19 Drawing Sheets

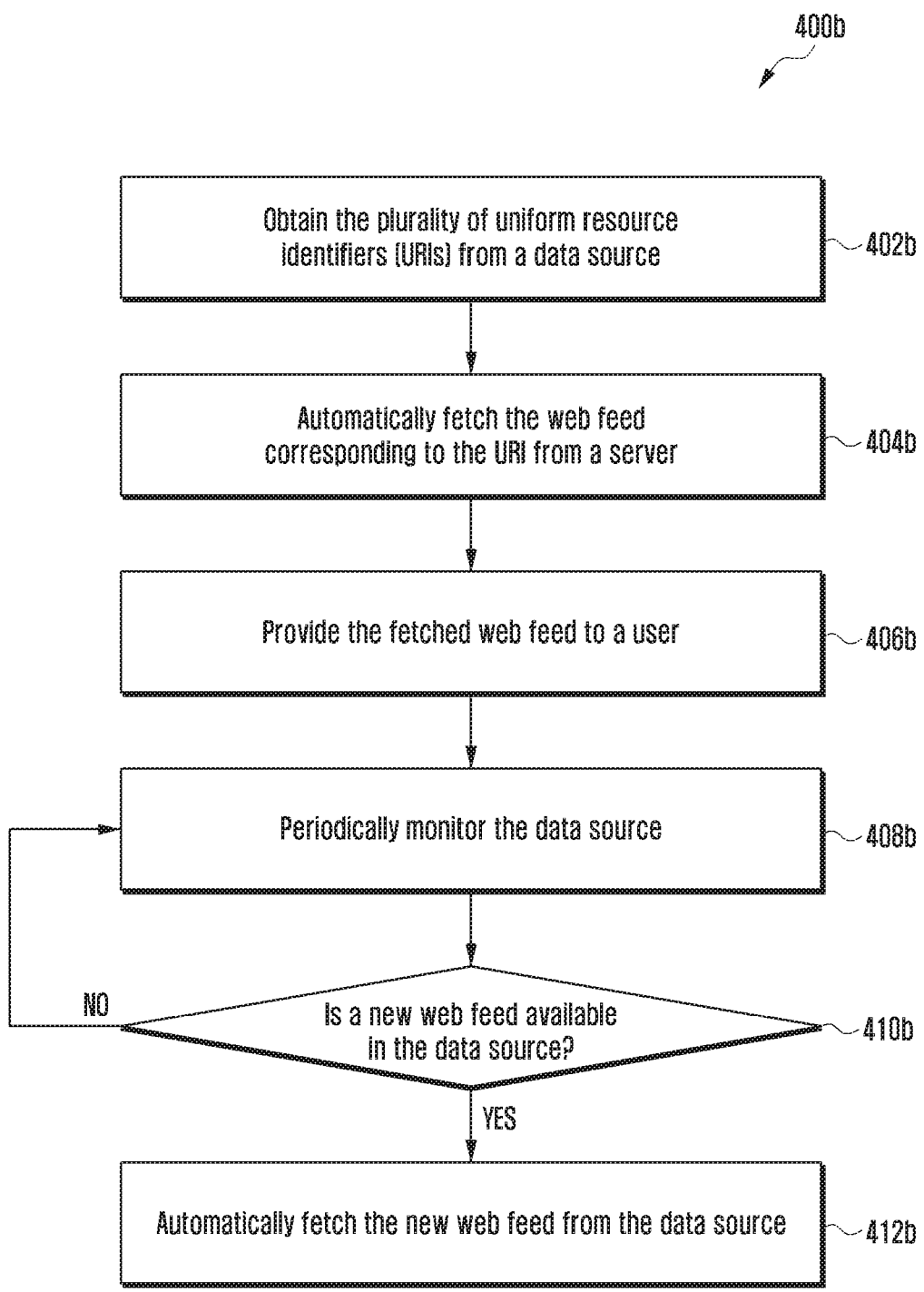

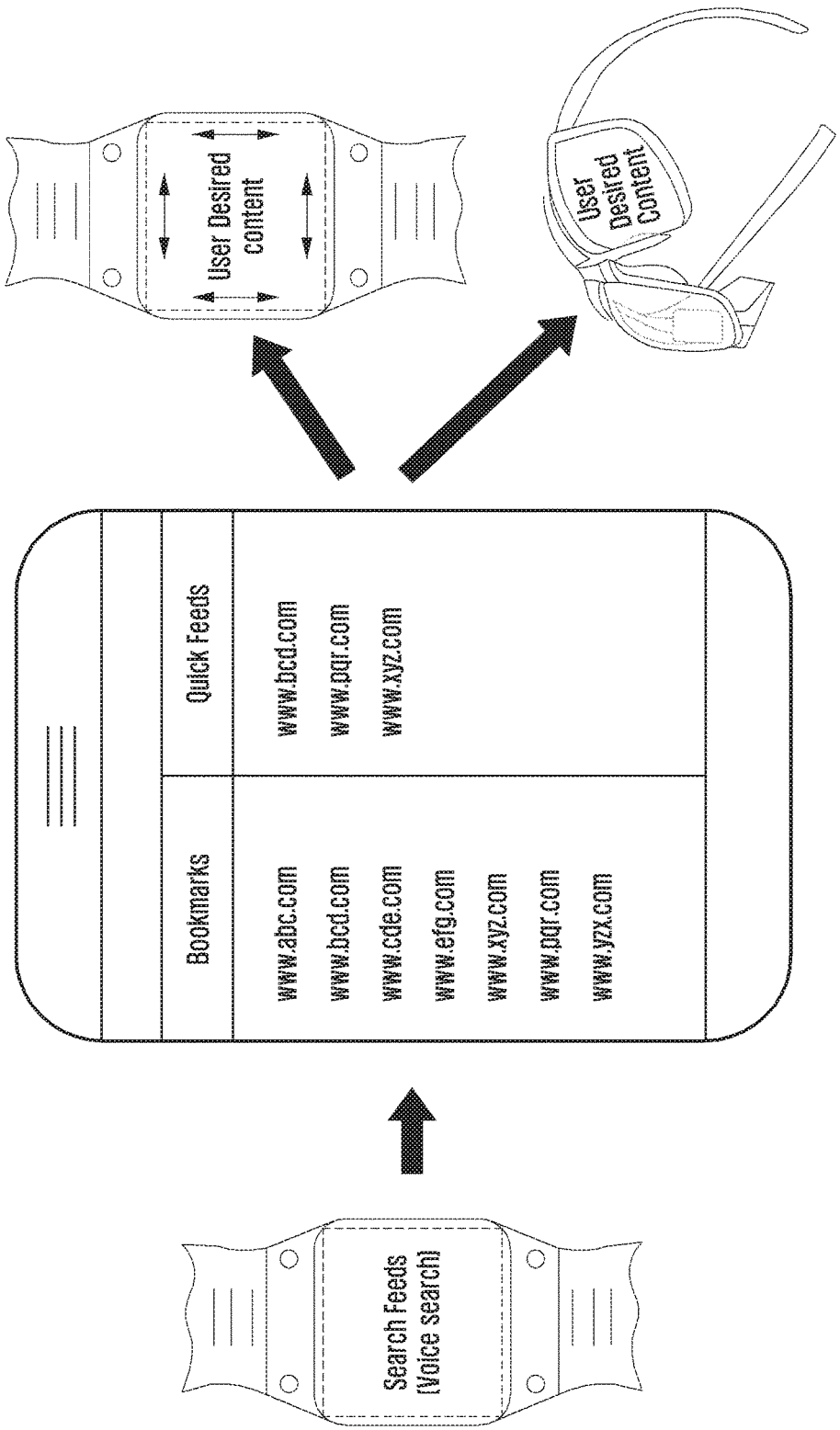

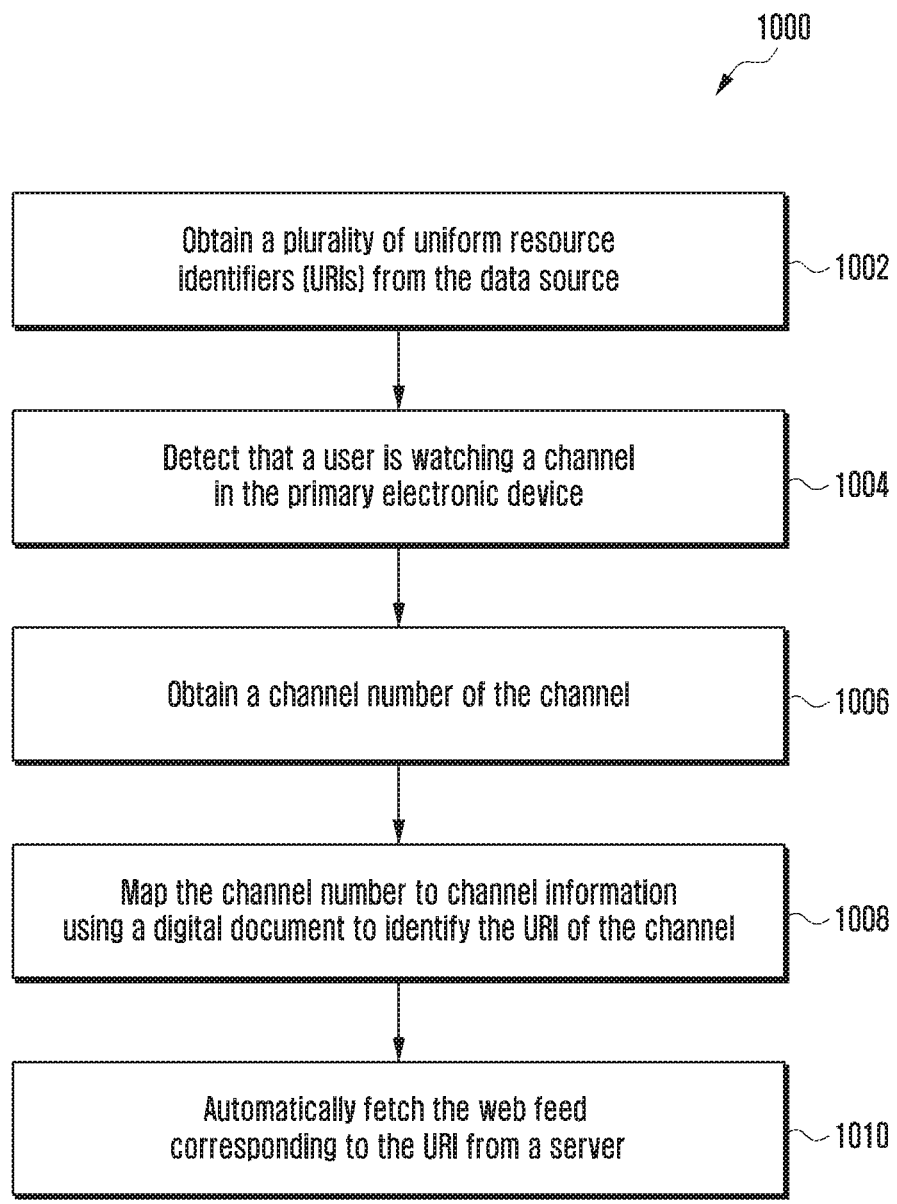

METHOD AND SYSTEM OF PROVIDING A WEB FEED IN A UNIFORM RESOURCE IDENTIFIER

CROSS-REFERENCE TO RELATED APPLICATION(S)

This application claims the benefit under 35 U.S.C. § 119(a) of an Indian patent application filed on Dec. 29, 2014 in the Indian Patent Office and assigned Serial number 6668/CHE/2014, and of a Korean patent application filed on Nov. 16, 2015 in the Korean Intellectual Property Office and assigned Serial number 10-2015-0160670, the entire disclosure of which is hereby incorporated by reference.

TECHNICAL FIELD

The present disclosure relates to a web feed personalization. More particularly, the present disclosure relates to a method and system of providing the web feed in a uniform resource identifier (URI).

BACKGROUND

Generally, a web feed is a data format used for providing a summary of contents on a website or on a portion of the website. There are various main web feed formats such as a really simple syndication or a resource description framework (RDF) site summary or a rich site summary (RSS) feed and an Atom feed supporting major news websites and blogs, where the web feed is used for requesting the website for a list of recent changes. The web feed allows the website to publish machine processable information about the recent changes to the documents that reside on the website. The web feed may be associated with a uniform resource locator (URL). The web feed is particularly useful for a user who wants to keep track of newly added information on the favorite website without having to visit the website regularly and search for a new content, by the user.

In systems of the related art, the RSS web feed mechanism provides the up-to-date web content to the users by polling and updating changes to the web content with the electronic device. When the user accesses the web content using the electronic device, the RSS web feed may waste too much communication bandwidth in polling the changes to the web content. The RSS web feed also needs to be connected to the internet to perform the polling. Also, the web feed may consume a lot of time for accessing the web content while loading the full web content thus, degrading the user experience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system of providing a web feed in a uniform resource identifier (URI).

Another aspect of the present disclosure is to provide a method and system for transferring the fetched web feed from a primary electronic device to a secondary electronic device.

Another aspect of the present disclosure is to provide a method and system for transferring the fetched web feed from an electronic device to a wearable device after determining that the web feed fits a display area of the wearable device.

In accordance with an aspect of the present disclosure, a method of providing a web feed in a URI is provided. The method includes obtaining, by a processing unit, a plurality of URIs from at least one data source in a primary electronic device, automatically fetching, by a parsing unit, at least one web feed, corresponding to at least one URI of the plurality of URIs, from a server, and providing the fetched at least one web feed.

In accordance with another aspect of the present disclosure, a system of providing a web feed in a URI is provided. The system includes a processing unit configured to obtain a plurality of URIs from at least one data source in a primary electronic device, and a parsing unit configured to automatically fetch at least one web feed, corresponding to at least one URI of the plurality of URIs, from a server and provide the fetched at least one web feed.

In accordance with another aspect of the present disclosure, a computer program product including a computer executable program code recorded on a computer readable non-transitory storage medium is provided. The computer executable program code, when executed, causes actions of obtaining a plurality of URIs from at least one data source in a primary electronic device, automatically fetching at least one web feed corresponding to at least one URI of the plurality of URIs from a server, and providing the fetched at least one web feed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4B is a flow diagram illustrating a method for indicating a new web feed to the user in a data source according to various embodiments of the present disclosure;

FIG. 9B is an example illustration for automatically fetching and displaying the content of the web feed on the wearable devices according to various embodiments of the present disclosure;

FIG. 10 is a flow diagram illustrating a method for providing the web feed by extracting channel information from the electronic device according to various embodiments of the present disclosure;

Throughout the drawings, like reference numerals will be understood to refer to like parts, components, and structures.

DETAILED DESCRIPTION

Figure 1A:
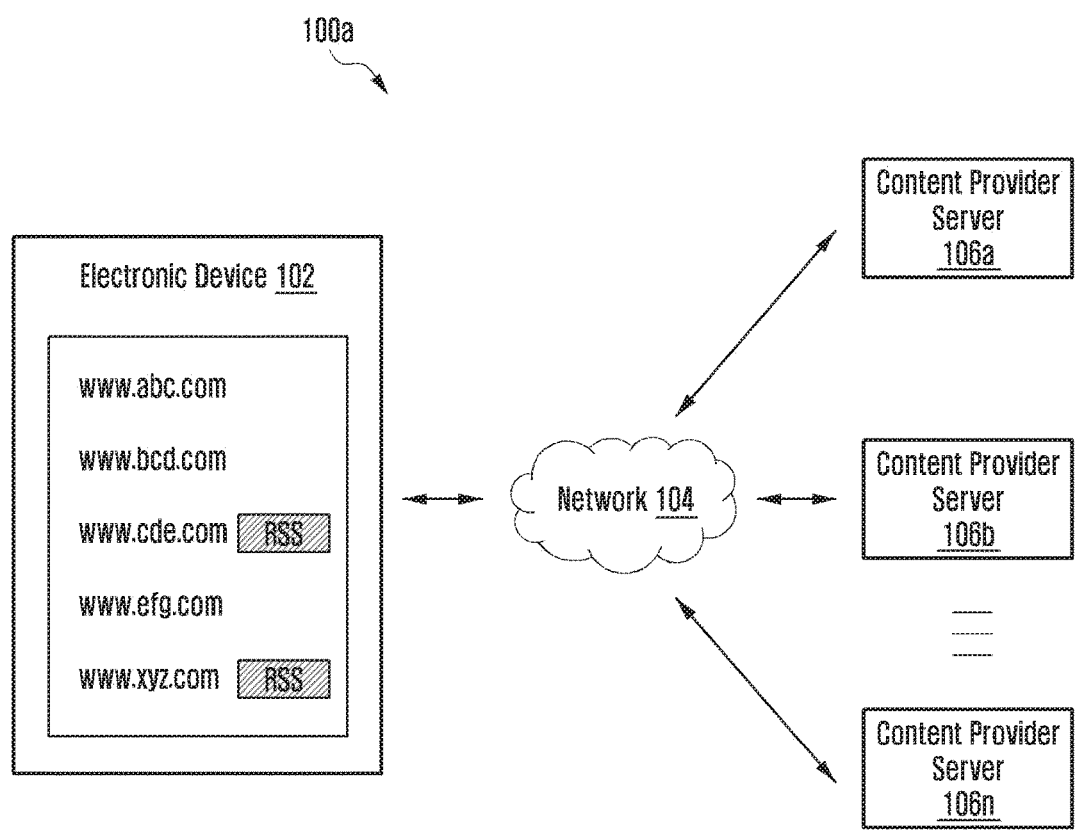
FIG. 1A illustrates generally, among other things, a high level overview of a system of providing a web feed in a uniform resource identifier (URI) according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the present disclosure achieve a method and system of providing a web feed in a uniform resource identifier (URI). The method includes obtaining a plurality of URIs from the data source in a primary electronic device. Further, the method includes automatically fetching the web feed corresponding to the URI from a server. Furthermore, the method includes providing the fetched web feed. In an embodiment of the present disclosure, the method includes indicating the web feed corresponding to the URI in the primary electronic device. In an embodiment of the present disclosure, the web feed is indicated by prioritizing the plurality of URIs. In an embodiment of the present disclosure, the URI can be, for example but not limited to, a uniform resource locator (URL).

In an embodiment of the present disclosure, the method includes storing the web feed in the primary electronic device. In an embodiment of the present disclosure, the method includes storing the web feed in cloud storage.

In an embodiment of the present disclosure, the method includes transferring the web feed to a secondary electronic device from the primary electronic device.

In an embodiment of the present disclosure, the method includes selecting the web feed from the plurality of web feeds in the data source in the primary electronic device based on a display area of the secondary electronic device. In an embodiment of the present disclosure, the secondary electronic device is a wearable device.

In an embodiment of the present disclosure, the web feed is automatically identified by obtaining an input from a user and mapping the input to the URI in the primary electronic device.

In an embodiment of the present disclosure, the method includes detecting the web feed corresponding to the URI, where the URI is marked by the user for offline reading. Further, the method includes determining whether the wireless data connection is available to retrieve the content in the URI. The method includes retrieving the content after determining whether the wireless data connection is available.

In an embodiment of the present disclosure, the web feed is automatically identified by detecting whether the user is watching a channel in the primary electronic device, obtaining a channel number, and mapping the channel number to the channel information using a digital document to identify the URI of the channel.

In an embodiment of the present disclosure, the method includes periodically monitoring the URI. Further, the method includes determining whether a new web feed is available in the URI. Furthermore, the method includes indicating the new web feed to the user.

In an embodiment of the present disclosure, the method includes periodically monitoring the data source. Further, the method includes determining whether a new web feed is available in the data source. Furthermore, the method includes automatically identifying the web feed corresponding to the URI after determining that the new URI is available in the data source.

Unlike systems of the related art, the proposed system and method can automatically detect the web feeds from the URI.

Unlike systems of the related art, the proposed system and method can transfer the information to the wearable device in the form of tiny feeds.

Unlike systems of the related art, the proposed system and method allows the user interface (UI) to indicate the available new web feeds on the wearable devices.

Unlike systems of the related art, the proposed system and method allows the user to access the desired web content in the form of the web feeds from the URI, even when the user is experiencing a low bandwidth connection in the electronic device.

Unlike systems of the related art, the proposed system and method can indicate to the user about the availability of the new web feed for the URI in the data source without the user having to access the URI.

Unlike systems of the related art, the proposed system and method can extract and display the web feeds related to a currently running television (TV) channel to the user with the help of an electronic program guide (EPG).

Referring now to the drawings and more particularly to FIGS. 1A to 12, where similar reference characters denote corresponding features consistently throughout the figures, there are shown preferred embodiments of the present disclosure.

FIG. 1A illustrates generally, among other things, a high level overview of a system 100a of providing the web feed in the URI according to various embodiments of the present disclosure.

Referring to FIG. 1A, in an embodiment of the present disclosure, the system 100a includes an electronic device 102, a network 104, and one or more content provider server's 106a, 106b, . . . 106n (i.e., hereafter referred to as content provider(s) 106).

The electronic device 102 can be, for example and not limited to, a mobile phone, a smart phone, the TV, a personal digital assistant (PDA), a tablet, a phablet, a computer, a wearable device, and the like. In an embodiment of the present disclosure, the wearable device can be, for example and not limited to, a smart watch, smart glasses, and the like.

The network 104 described herein can be for example, but not limited to, a wireless network, a wire line network.

In an embodiment of the present disclosure, the electronic device 102 is configured to obtain the web content from the content provider servers 106 over the network 104. The content provider servers 106 include a web feed service component (not shown) used to implement the web feed service. The content provider servers 106 can process the web feed service requests received from the electronic device 102. Further, the electronic device 102 is configured to obtain the plurality of URIs from the data source and automatically identify the web feed corresponding to the URI. In an embodiment of the present disclosure, the URI can be, for example but not limited to, a URL. In an embodiment of the present disclosure, the data source can be, for example but not limited to a, bookmark, history, quick access, most visited, speed dial, electronic mail (email), instant messaging, short messaging service (SMS) and the like. Further, the electronic device 102 is configured to store the web feed and indicate the web feed to the user.

In an embodiment of the present disclosure, the electronic device 102 is configured to detect the web feed corresponding to the URI, where the URI is marked by the user for offline reading. The electronic device 102 is configured to determine whether the wireless data connection is available to retrieve the content in the URI. Further, the electronic device 102 is configured to retrieve the content after determining that the wireless data connection is available.

FIG. 1A shows a limited overview of the system 100a but, it is to be understood that other embodiments of the present disclosure are not limited thereto. Further, the system 100a can include any number of electronic devices along with other hardware or software components communicating with each other.

Figure 1B:
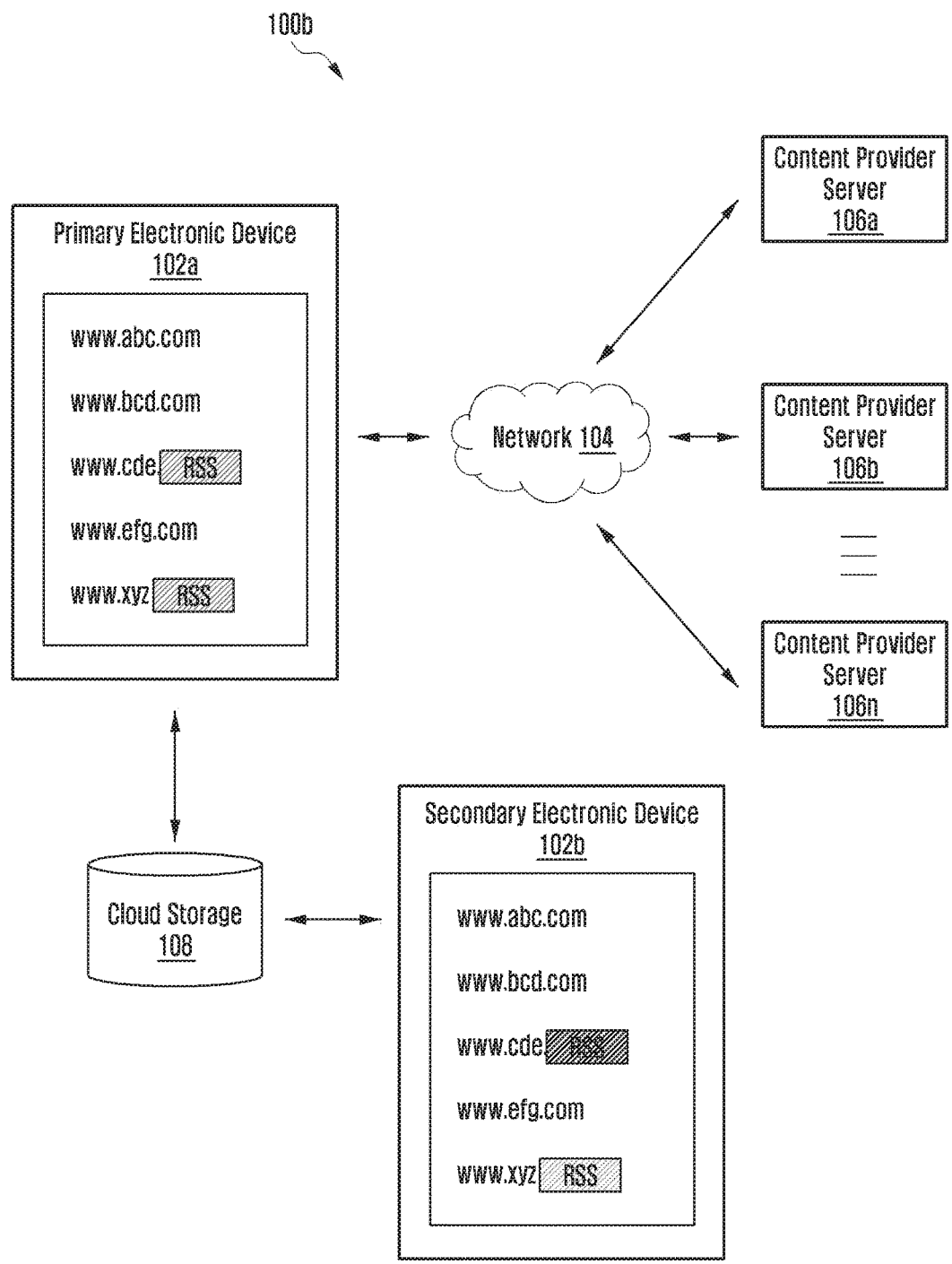
FIG. 1B illustrates generally, among other things, a high level overview of a system of providing and transferring the web feed from a primary electronic device to a secondary electronic device according to various embodiments of the present disclosure.

FIG. 1B illustrates generally, among other things, a high level overview of the system 100b of providing and transferring the web feed from the primary electronic device 102a to the secondary electronic device 102b according to various embodiments of the present disclosure.

Referring to FIG. 1B, in an embodiment of the present disclosure, the system 100b includes the primary electronic device 102a, the secondary electronic device 102b, the network 104, the content provider servers 106, and cloud storage 108.

The primary electronic device 102a or the secondary electronic device 102b can be, for example and not limited to, a mobile phone, a smart phone, a TV, a PDA, a tablet, a phablet, a computer, a wearable device, and the like. The functionalities of the primary electronic device 102a are explained in conjunction with the electronic device 102 as described in FIG. 1A.

In an embodiment of the present disclosure, the content provider servers 106 also includes user profile database (not shown) which stores account-specific information about the users of the website to update the web feed. Further, the functionalities of the content provider servers 106 are explained in conjunction with FIG. 1A.

In an embodiment of the present disclosure, the primary electronic device 102a is configured to obtain the plurality of URIs from the data source and automatically identify the web feed corresponding to the URI. The primary electronic device 102a is configured to store the web feed and indicate the web feed to the user. The primary electronic device 102a is configured to transfer the web feed to the secondary electronic device 102b. Further, the primary electronic device 102a can be configured to transfer the web feed to the cloud storage 108 for storing the web feed in the cloud storage 108.

In an embodiment of the present disclosure, the secondary electronic device 102b can be configured to obtain the web feed from the cloud storage 108.

In an embodiment of the present disclosure, the primary electronic device 102a or the secondary electronic device 102b is configured to detect the web feed corresponding to the URI, where the URI is marked by the user for offline reading. Further, the primary electronic device 102a or the secondary electronic device 102b is configured to determine whether the wireless data connection is available to retrieve the content in the URI. Further, the primary electronic device 102a or the secondary electronic device 102b is configured to retrieve the content after determining that the wireless data connection is available.

The functionalities performed by the primary electronic device 102a can also be performed by the secondary electronic device 102b without limiting the scope of the present disclosure as shown in FIG. 1B.

FIG. 1B shows a limited overview of the system 100b but, it is to be understood that other embodiments of the present disclosure are not limited thereto. Further, the system 100b can include any number of electronic devices along with other hardware or software components communicating with each other.

Figure 2:
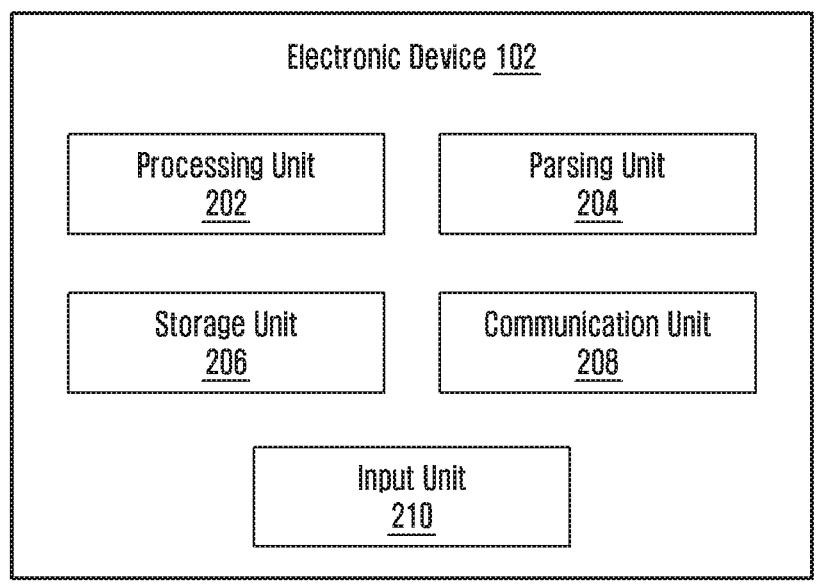
FIG. 2 shows various modules of an electronic device according to various embodiments of the present disclosure.

FIG. 2 shows various modules of the electronic device 102 according to various embodiments of the present disclosure.

Referring to FIG. 2, in an embodiment of the present disclosure, the electronic device 102 includes a processing unit 202, a parsing unit 204, a storage unit 206, a communication unit 208, and an input unit 210.

The processing unit 202 is configured to obtain the plurality of URIs from the data source. The processing unit 202 is configured to send the plurality of URIs to the parsing unit 204.

In an embodiment of the present disclosure, the processing unit 202 is configured to identify the user desired content based on the data source. In an embodiment of the present disclosure, the data source may include user browsed information or the related web pages such as the web pages from the website. In an example, if the user has viewed the current web page multiple times in the past one month then the processing unit 202 is configured to determine that the user has an interest in the web page. On determining that the user has the interest in the web page, the storage unit 206 is configured to automatically store the web feed. In an embodiment of the present disclosure, the data source may be preconfigured by the user.

The parsing unit 204 is configured to automatically identify the web feed corresponding to the URI.

In an embodiment of the present disclosure, the parsing unit 204 is configured to use a browsing history maintained by the data source to track the browsing activities of the user. An existing web feed detection mechanism of the data source can be utilized to determine whether the certain web page is associated with the web feed.

In an embodiment of the present disclosure, the parsing unit 204 is configured to processes the data source, where the data source indicates the browsing activities of the user. Further, the parsing unit 204 is configured to track the web pages which are accessed by the user. Furthermore, the parsing unit 204 is configured to detect whether the accessed web pages by the user are associated with the web feeds.

In an embodiment of the present disclosure, the parsing unit 204 is configured to detect a code (<rss feed> ... </rss feed>-->, <rss type=link, and the like) for the web feed from hypertext markup language (HTML) script tags and extensible markup language (XML) script tags; thereby, extracting the web feed from the data source. Further, the parsing unit 204 is configured to send the web feed corresponding to the URI, to the storage unit 206.

On receiving the web feeds corresponding to the URIs from the parsing unit 204, the storage unit 206 is configured to store the web feeds. Further, the storage unit 206 is configured to store and maintain the browsing activities and the configuration information of the user for the web feed. In an embodiment of the present disclosure, the stored browsing activities include addresses of the web pages visited by the user (e.g., their URI (e.g., URL)), time of such visits, whether the web pages support web feeds, whether the user is prompted for the web feed subscription, the manner of the prompt, and the user's response to the prompt.

The communication unit 208 such as a Wi-Fi communication unit or a Bluetooth communication unit is configured to transfer the web feed to the secondary electronic device 102b. In an embodiment of the present disclosure, the secondary electronic device 102b can be, for example but not limited to, the wearable device. The input unit 210 is configured to obtain an input from the user. Based on the input, the input unit 210 is configured to correlate the received input with the URI. In an embodiment of the present disclosure, the input may be a gesture based input, voice based input, and the like.

The units of the electronic device 102 can also be part of the primary electronic device 102a or the secondary electronic device 102b without limiting the scope of the disclosure.

FIG. 2 shows a limited overview of the electronic device 102 but, it is to be understood that other embodiments of the present disclosure are not limited thereto. Further, the electronic device 102 can include any number of units communicating among each other along with the other components of the system 100a. Likewise, the functionalities of each unit can be distributed among the units in a manner different than described herein (e.g., combining functionalities of different units).

Figure 3:
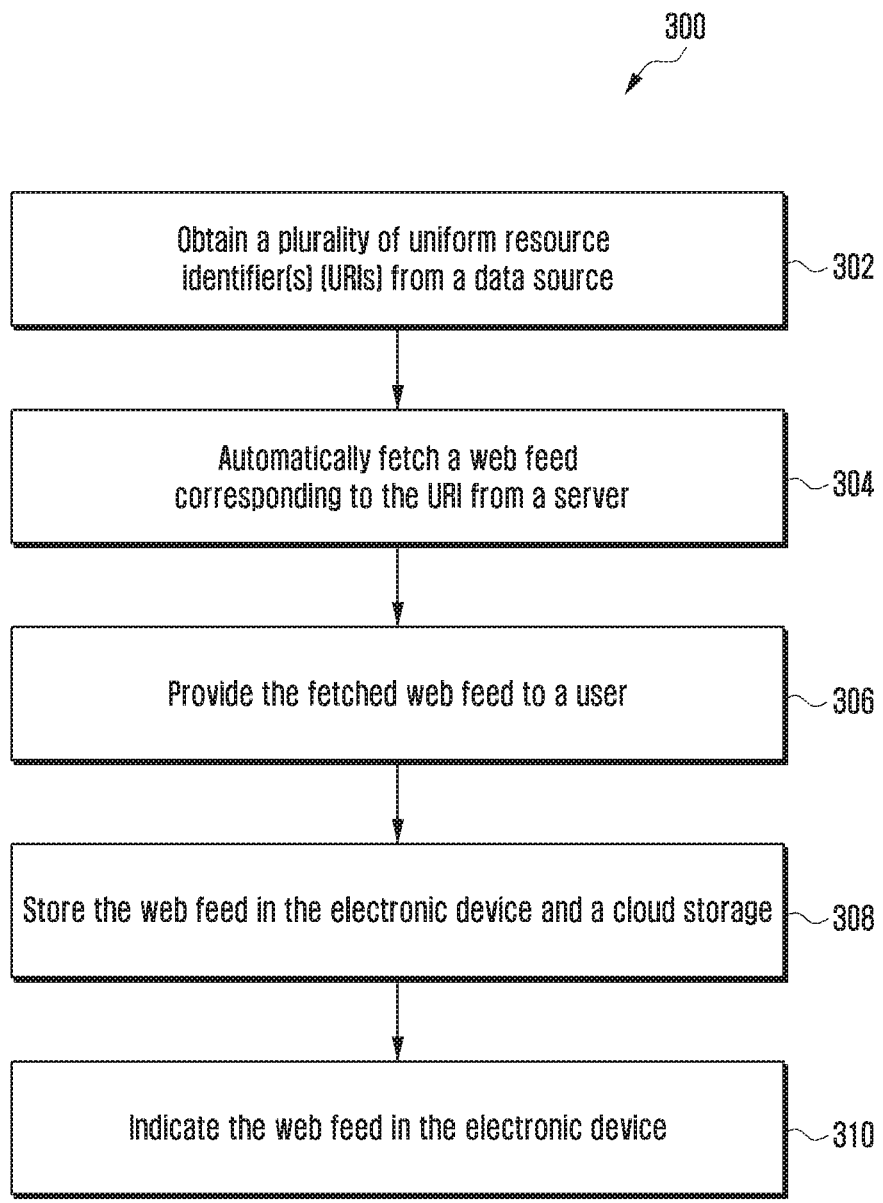
FIG. 3 is a flow diagram illustrating a method of providing the web feed in a URI according to various embodiments of the present disclosure.

FIG. 3 is a flow diagram illustrating a method 300 of providing the web feed in the URI according to various embodiments of the present disclosure.

Referring to FIG. 3, at operation 302, the method 300 includes obtaining the plurality of URIs from the data source in the electronic device 102. In an embodiment of the present disclosure, the method allows the processing unit 202 to obtain the plurality of URIs from the data source in the electronic device 102.

At operation 304, the method 300 includes automatically fetching the web feed corresponding to the URI from the server 106. In an embodiment of the present disclosure, the method 300 allows the parsing unit 204 to automatically identify the web feed corresponding to the URI from the server 106. At operation 306, the method 300 includes providing the fetched web feed to the user. In an embodiment of the present disclosure, the method 300 allows the parsing unit 204 to provide the fetched web feed to the user.

At operation 308, the method 300 includes storing the web feed in the electronic device 102 and the cloud storage 108. In an embodiment of the present disclosure, the method 300 allows the storage unit 206 to store the web feed in the electronic device 102. In an embodiment of the present disclosure, the method 300 allows the storage unit 206 to store the web feed in the cloud storage 108.

At operation 310, the method 300 includes indicating the web feed in the electronic device 102. In an embodiment of the present disclosure, the method 300 allows the processing unit 202 to indicate the web feed in the electronic device 102.

The various actions, acts, blocks, operations, and the like in method 300 may be performed in the order presented, in a different order or simultaneously. Further, in some embodiments of the present disclosure, some actions, acts, blocks, operations, and the like may be omitted, added, modified, skipped, and the like without departing from the scope of the present disclosure.

Figure 4A:
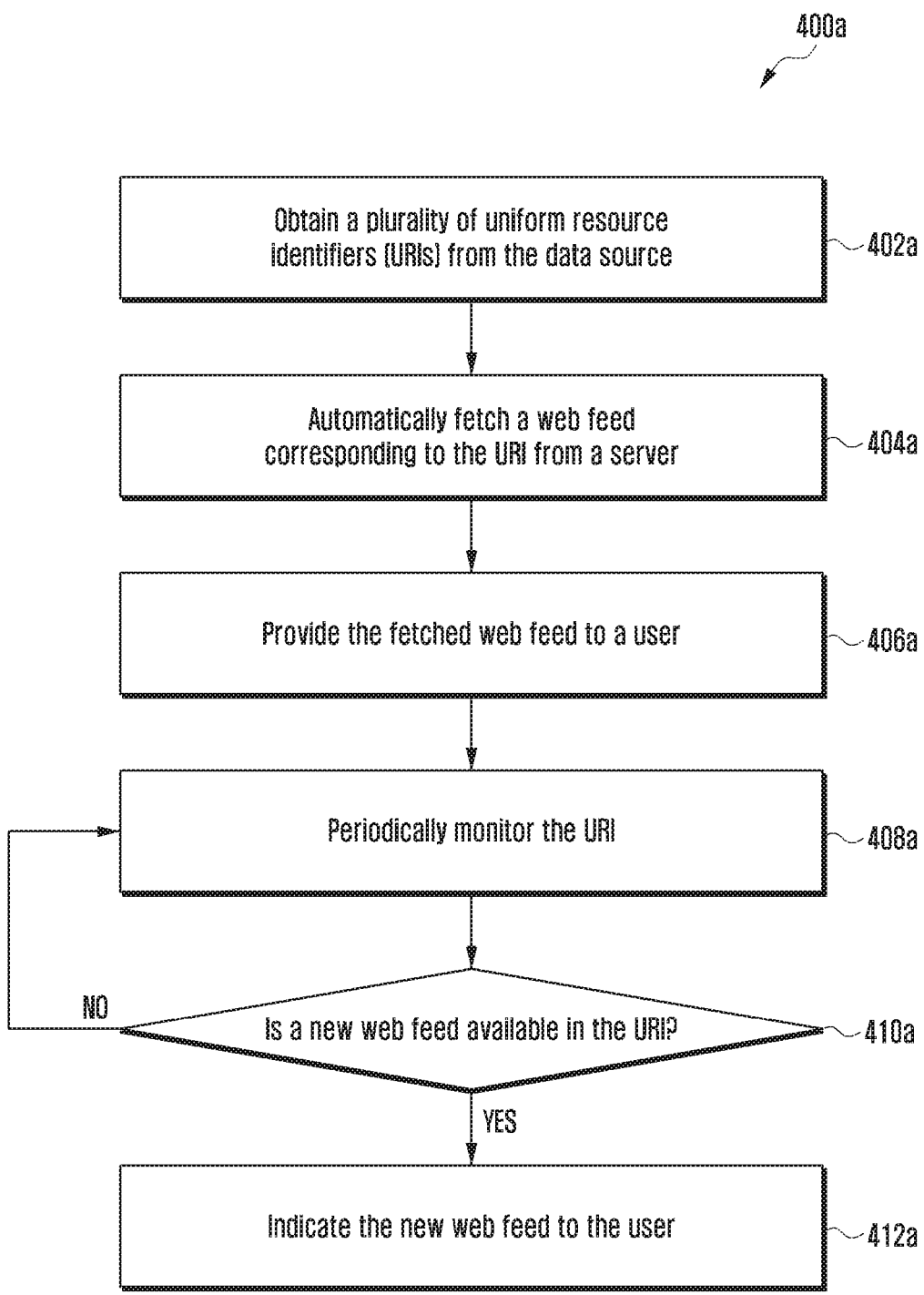
FIG. 4A is a flow diagram illustrating a method for indicating a new web feed in the URI to a user according to various embodiments of the present disclosure.

FIG. 4A is a flow diagram illustrating a method 400a for indicating the new web feed in the URI to the user according to various embodiments of the present disclosure.

Referring to FIG. 4A, at operation 402a, the method 400a includes obtaining the plurality of URIs from the data source. In an embodiment of the present disclosure, the method 400a allows the processing unit 202 to obtain the plurality of URIs from the data source.

At operation 404a, the method 400a includes automatically fetching the web feed corresponding to the URI from the server 106. In an embodiment of the present disclosure, the method 400a allows the parsing unit 204 to automatically fetch the web feed corresponding to the URI from the server 106. At operation 406a, the method 400a includes providing the fetched web feed to the user. In an embodiment of the present disclosure, the method 400a allows the parsing unit 204 to provide the fetched web feed to the user.

At operation 408a, the method 400a includes periodically monitoring the URI. In an embodiment of the present disclosure, the method 400a allows the processing unit 202 to periodically monitor the URI. If it is determined, at operation 410a, that the new web feed is available in the URI then, at operation 412a, the method 400a includes indicating the new web feed to the user. In an embodiment of the present disclosure, the method 400a allows the processing unit 202 to indicate the new web feed to the user. If it is determined, at operation 410a, that the new web feed is not available then, at operation 408a, the method 400a includes periodically monitoring the URI.

In an embodiment of the present disclosure, the processing unit 202 is configured to indicate to the user about the availability of the new web feed for the URI by flashing the URI or using a special indicator (e.g., button, icon, text with the web feed symbol) next to the URI.

In an embodiment of the present disclosure, if the processing unit 202 does not identify any of the new web feed in the URI then, an error message will be displayed to the user.

The various actions, acts, blocks, operations, and the like in method 400a may be performed in the order presented, in a different order or simultaneously. Further, in some embodiments, some actions, acts, blocks, operations, and the like may be omitted, added, modified, skipped, and the like without departing from the scope of the present disclosure.

FIG. 4B is a flow diagram illustrating a method 400b for indicating the new web feed to the user in the data source according to various embodiments of the present disclosure.

Referring to FIG. 4B, at operation 402b, the method 400b includes obtaining the plurality of URIs from the data source. In an embodiment of the present disclosure, the method 400b allows the processing unit 202 to obtain the plurality of URIs from the data source. In an embodiment of the present disclosure, the data source can be, for example and not limited to, the bookmark, the history, the most visited site, the speed dial, the electronic mail, the chat, and the like.

At operation 404b, the method 400b includes automatically fetching the web feed corresponding to the URI from the server 106. In an embodiment of the present disclosure, the method 400b allows the parsing unit 204 to automatically fetch the web feed corresponding to the URI from the server 106. At operation 406b, the method 400b includes providing the fetched web feed to the user. In an embodiment of the present disclosure, the method 400b allows the parsing unit 204 to provide the fetched web feed to the user.

At operation 408b, the method 400b includes periodically monitoring the data source. In an embodiment of the present disclosure, the method 400b allows the processing unit 202 to periodically monitor the data source.

If it is determined, at operation 410b, that the new web feed is available in the data source, then, at operation 412b, the method 400b includes automatically fetch the new web feed from the data source. In an embodiment of the present disclosure, the method 400b allows the processing unit 202 to automatically fetch the web feed from the data source. In an embodiment of the present disclosure, the method 400b allows the processing unit 202 to prompt the user with the availability of the new web feed from the data source without the user accessing the URI. If it is determined, at operation 410b, that the new web feed is not available in the data source then, at operation 408b, the method 400b includes periodically monitoring the data source.

In an embodiment of the present disclosure, if the processing unit 202 does not identify any of the new web feed in the data source then, an error message will be displayed to the user.

The various actions, acts, blocks, operations, and the like in the method 400b may be performed in the order presented, in a different order or simultaneously. Further, in some embodiments of the present disclosure, some actions, acts, blocks, operations, and the like may be omitted, added, modified, skipped, and the like without departing from the scope of the present disclosure.

Figure 5:
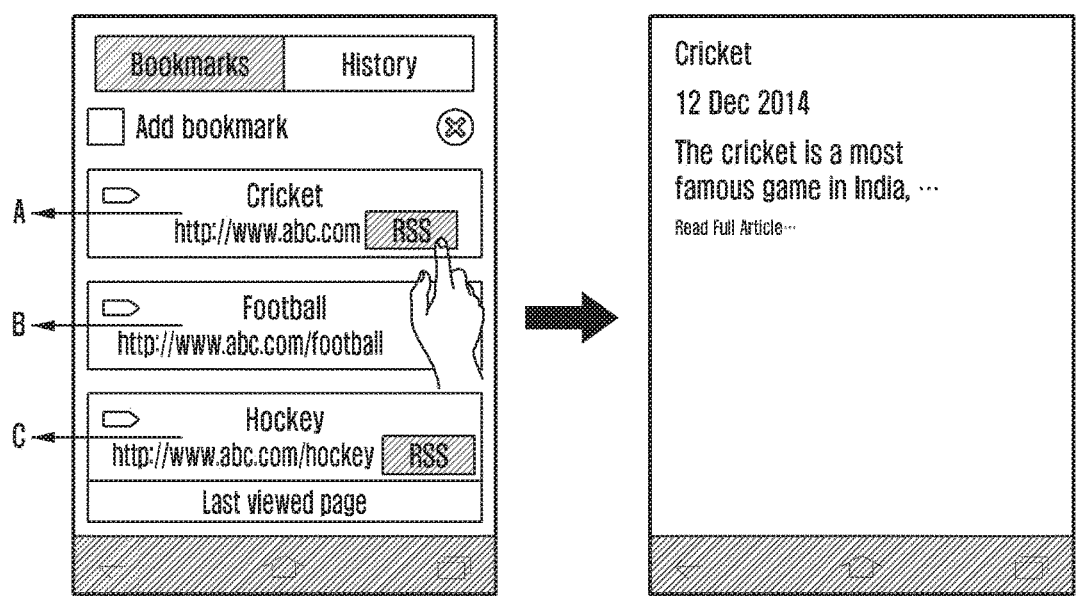
FIG. 5 shows a user interface (UI) for displaying the rich site summary (RSS) web feed in the URI on the electronic device according to various embodiments of the present disclosure.
Figure 6A:
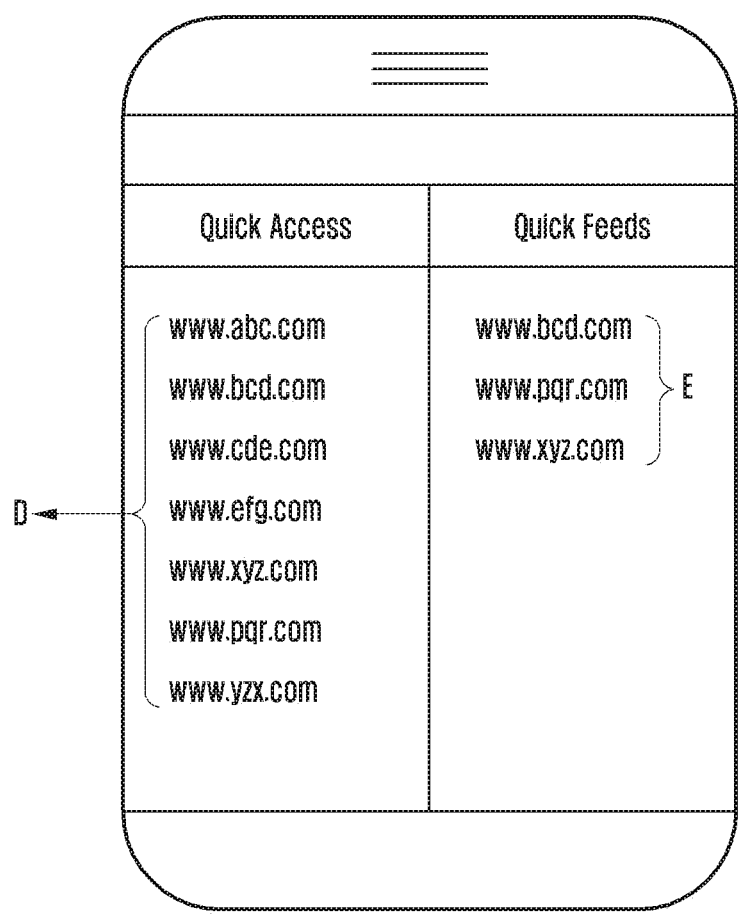
FIGS. 6A to 6D illustrate an example showing the RSS web feed in the URI stored in the data sources according to various embodiments of the present disclosure.
Figure 6B:
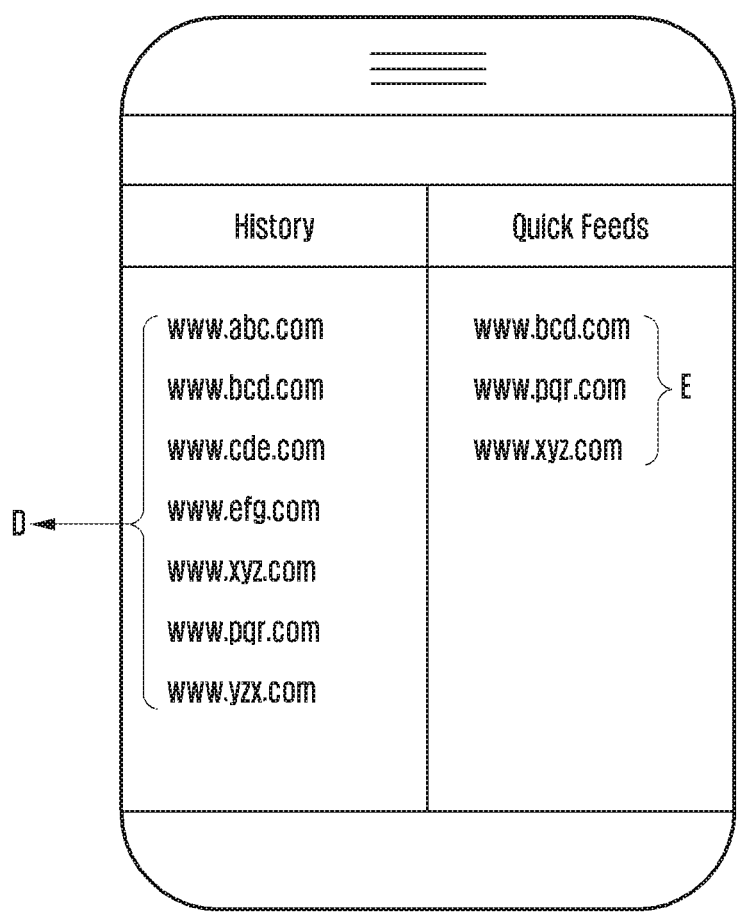
Figure 6C:
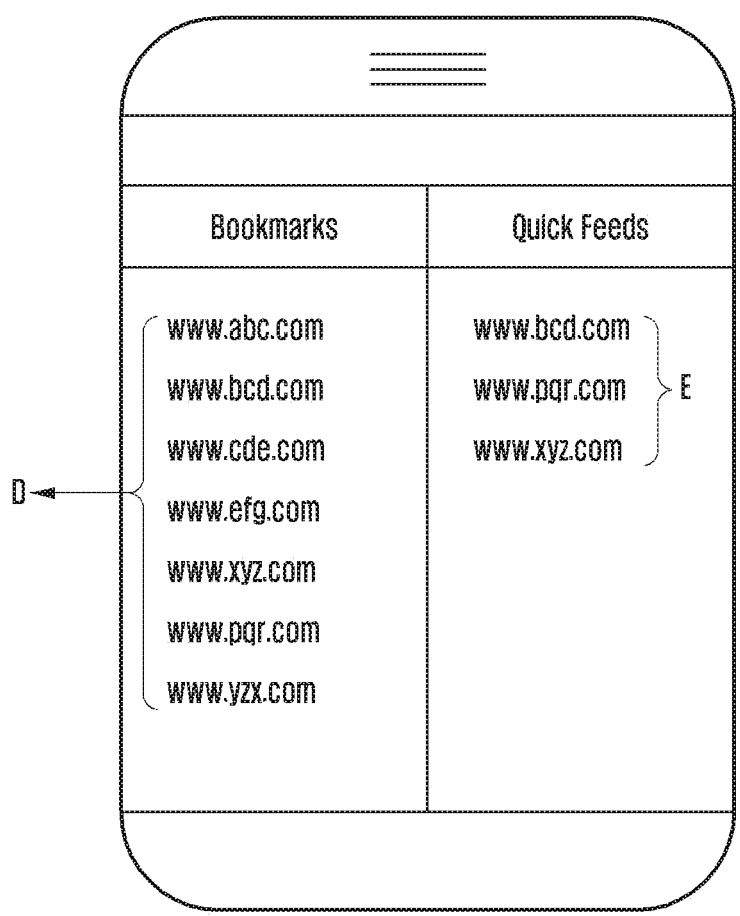
Figure 6D:
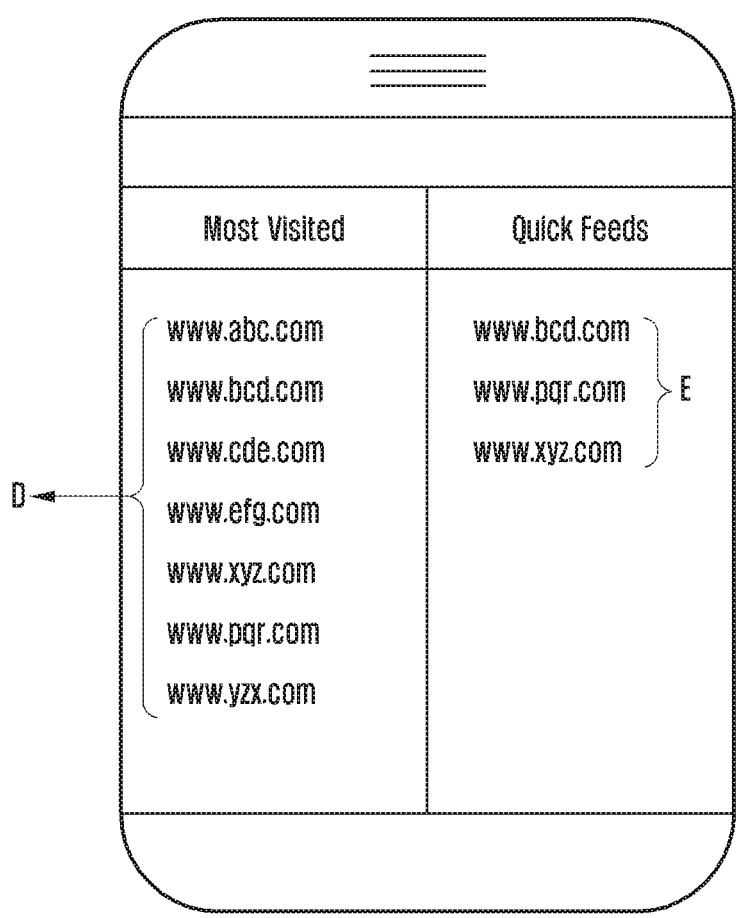

FIG. 5 shows a UI for displaying the rich site summary (RSS) web feed in the URI on the electronic device 102 according to various embodiments of the present disclosure.

Referring to FIG. 5, a notation "A" and a notation "C" denote the URL including the web feed. The user may obtain the updated web content from the content provider servers 106 corresponding to the URL without the user accessing the URI. The notation "B" denotes the URI is not including the web feed. The user may have to load the full web page to see the updated web content from the content provider servers 106 corresponding to the URI.

FIGS. 6A to 6D illustrate the example showing the RSS web feed in the URI stored in the data sources according to various embodiments of the present disclosure.

Referring to FIGS. 6A to 6D, a notation "D" denotes the web content in the quick access, history, bookmarks, and the most visited pages. A notation "E" denotes the URI with the stored web feed in the quick access, history, bookmarks, and the most visited pages.

Figure 7A:
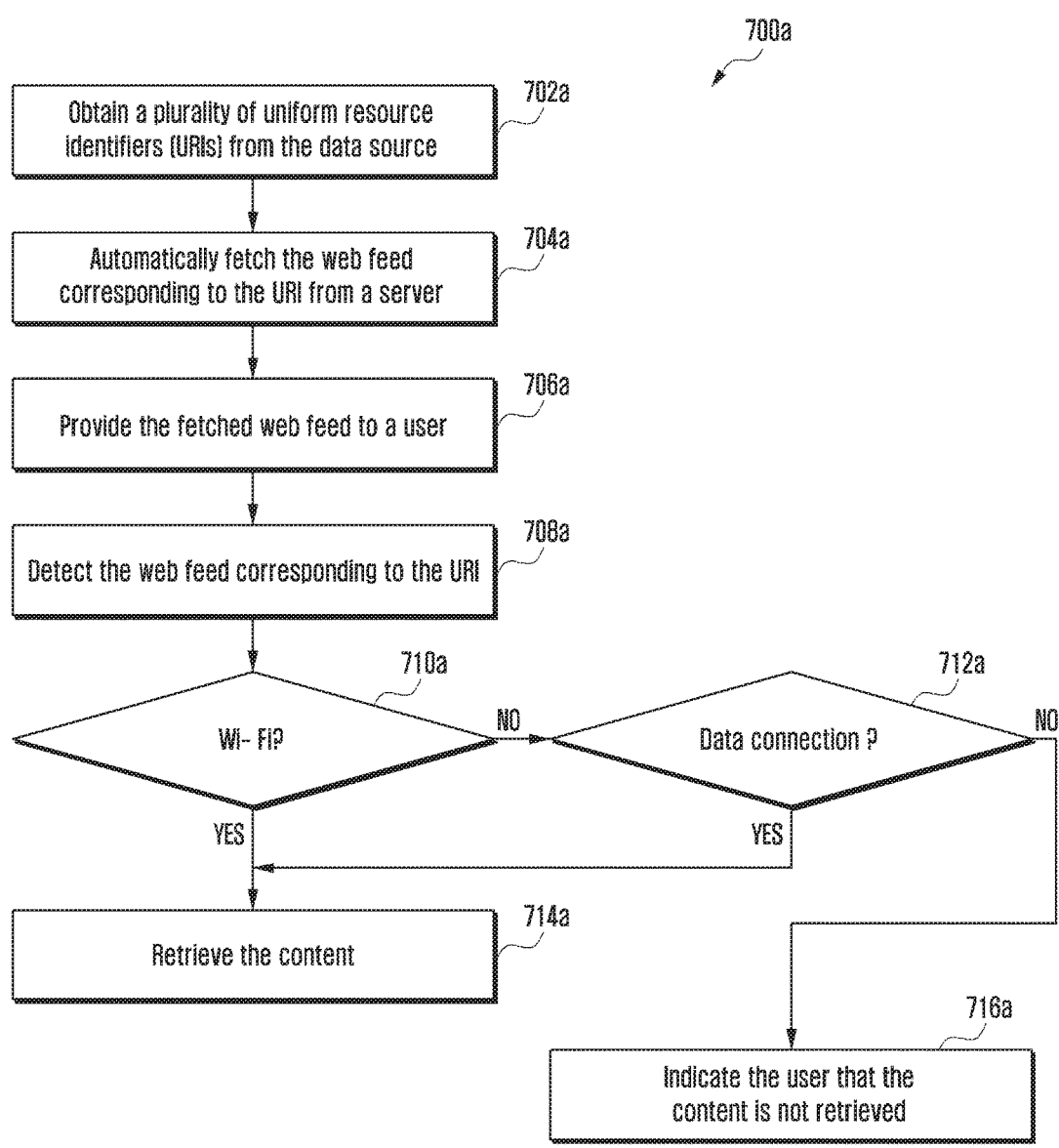
FIG. 7A is a flow diagram illustrating a method for retrieving the web content based on the availability of wireless data connection according to various embodiments of the present disclosure.

FIG. 7A is a flow diagram illustrating the method 700a for retrieving the web content based on the availability of wireless data connection according to various embodiments of the present disclosure.

Referring to FIG. 7A, at operation 702a, the method 700a includes obtaining the plurality of URIs from the data source. In an embodiment of the present disclosure, the method 700a allows the processing unit 202 to obtain the plurality of URIs from the data source. At operation 704a, the method 700a includes automatically fetching the web feed corresponding to the URI from the server 106. In an embodiment of the present disclosure, the method 700a allows the parsing unit 204 to automatically fetch the web feed corresponding to the URI from the server 106. At operation 706a, the method 700a includes providing the fetched web feed to the user. In an embodiment of the present disclosure, the method 700a allows the parsing unit 204 to provide the fetched web feed to the user.

At operation 708a, the method 700a includes detecting the web feed corresponding to the URI. In an embodiment of the present disclosure, the method 700a allows the parsing unit 204 to detect the web feed corresponding to the URI.

If it is determined, at operation 710a, that the Wi-Fi connection is available then, at operation 714a, the method 700a includes retrieving the content. In an embodiment of the present disclosure, the method 700a allows the processing unit 202 to retrieve the content. If it is determined, at operation 701a, that the Wi-Fi connection is not available then, at operation 712a, the method 700a includes determining whether the mobile data connection is available. In an embodiment of the present disclosure, the method 700a allows the processing unit 202 to determine whether the mobile data connection is available to retrieve the content in the URI.

If it is determined, at operation 712a, that the mobile data connection is available then, at operation 714a, the method 700a includes retrieving the content. In an embodiment of the present disclosure, the method 700a allows the processing unit 202 to retrieve the content. If it is determined, at operation 712a, that the mobile data connection is not available then, at operation 716a, the method 700a includes indicating the user that the web content is not retrieved. In an embodiment of the present disclosure, the method 700*a* allows the processing unit 202 to indicate the user that the web content is not retrieved.

In an embodiment of the present disclosure, user may mark the URI for offline reading. The parsing unit 204 can be configured to automatically download the web content associated with the new web feed in the backend when the Wi-Fi connection is available.

The various actions, acts, blocks, operations, and the like in method 700*a* may be performed in the order presented, in a different order or simultaneously. Further, in some embodiments of the present disclosure, some actions, acts, blocks, operations, and the like may be omitted, added, modified, skipped, and the like without departing from the scope of the present disclosure.

Figure 7B:
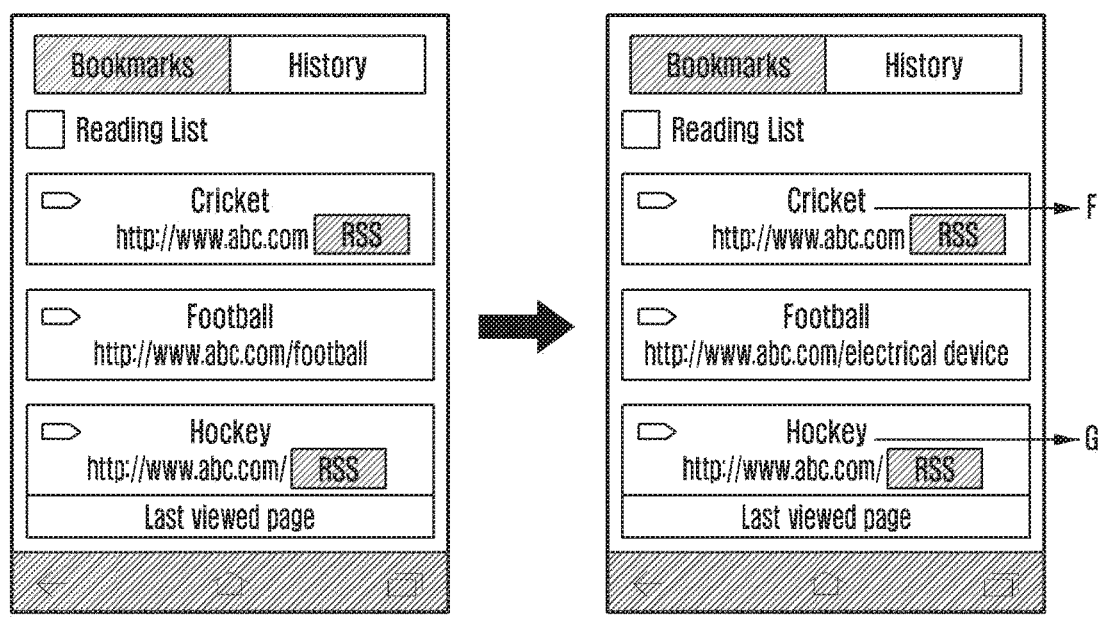
FIG. 7B is an example illustration for displaying whether the web content is retrieved based on the availability of wireless data connection according to various embodiments of the present disclosure.

FIG. 7B is an example illustration for displaying whether the web content is retrieved based on the availability of wireless data connection according to various embodiments of the present disclosure.

Referring to FIG. 7B, the electronic device 102 is configured to obtain the plurality of URIs from the data source, and configured to automatically identify the web feed corresponding to the URI. Based on the identified web feed, the electronic device 102 is configured to determine whether the wireless data connection such as the Wi-Fi internet connection is available to retrieve the content in the URI. On determining the availability of the Wi-Fi internet connection to retrieve the content in the URI, the electronic device 102 is configured to retrieve the content in the URI.

After determining the Wi-Fi internet connection is not available to retrieve the content in the URI, the electronic device 102 is configured to determine whether the wireless data connection such as the mobile data internet connection is available to retrieve the content in the URI. On determining the mobile data internet connection is available, the electronic device 102 is configured to retrieve the content in the URI.

After determining the mobile data internet connection is not available to retrieve the content in the URI, the electronic device 102 is configured to indicate the user that the web content is not downloaded.

In an embodiment of the present disclosure, the electronic device 102 is configured to process the retrieved content from the multiple subscribed web feeds and aggregate the subscribed content for easy viewing by the user. In an embodiment of the present disclosure, the user may also interact with the electronic device 102 to manage the subscribed web feeds and the retrieved web feed content. In an example, the user may configure the electronic device 102 to configure how the subscribed web feed content can be retrieved. The user may specify a time (e.g., between 10 PM and 5 AM) or a particular network connection (e.g., cellular network, wi-fi network, and the like) for the processing unit 202 to retrieve the subscribed web feed contents.

In an embodiment of the present disclosure, the electronic device 102 is configured to seek subscription to the web feeds by displaying a visual component such as an overlay text banner or a pop-up dialog. In an embodiment of the present disclosure, the user may interact with the electronic device 102 through the visual component to subscribe to the web feed or to customize the subscription or to the prompting mechanism.

As shown in FIG. 7B, a notation "F" denotes the retrieved web content in the URI after determining that the wireless data connection (e.g., mobile data internet connection or Wi-Fi internet connection) is available to retrieve the content in the URI. A notation "G" indicates the user that the web content is not retrieved.

Figure 8:
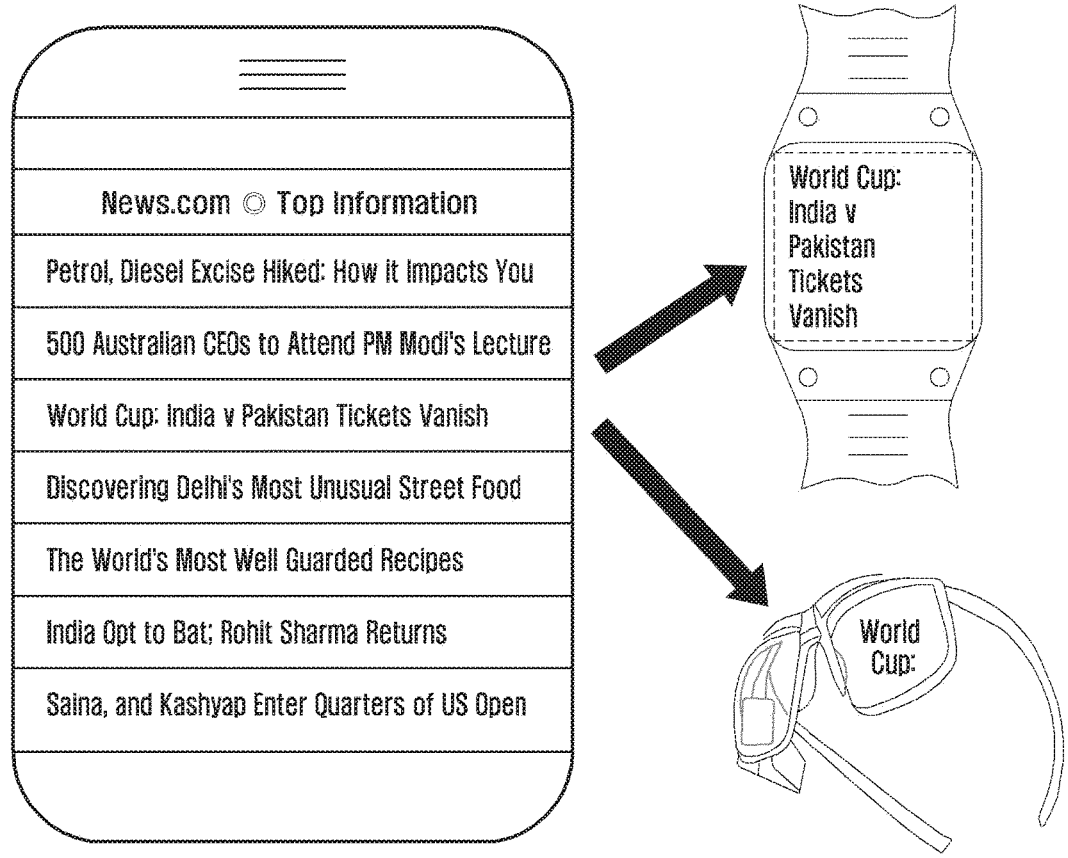
FIG. 8 is an example illustration showing the web feed being transferred to a wearable device from the electronic device according to various embodiments of the present disclosure.

FIG. 8 is an example illustration depicting the web feed transferred to the wearable device from the electronic device 102 according to various embodiments of the present disclosure.

Referring to FIG. 8, the communication unit 208 is configured to transfer the web feed to the wearable device by using a peer to peer communication (e.g., Bluetooth communication, and the like), so that the wearable device displays the web feed either configured by the user or learnt by a past user behavior.

In an embodiment of the present disclosure, the wearable device is configured to allow the user to provide different types of inputs (e.g., gesture based input and the like) to display the web feeds. In an embodiment of the present disclosure, the wearable device is configured to display only the top few web feeds. In an embodiment of the present disclosure, the wearable device is configured to display the web feed by accessing a widget application.

In an embodiment of the present disclosure, the processing unit 202 is configured to determine whether the web feed displayed on the electronic device 102 fits into the display area of the wearable device. On determining the web feed displayed on the electronic device 102 fits into the display area of the wearable device, the communication unit 208 is configured to transfer the web feed to the wearable device, such that the wearable device is configured to display the web feed. In an example, the display area of the wearable device is determined by computing the display coordinates of the wearable device.

Figure 9A:
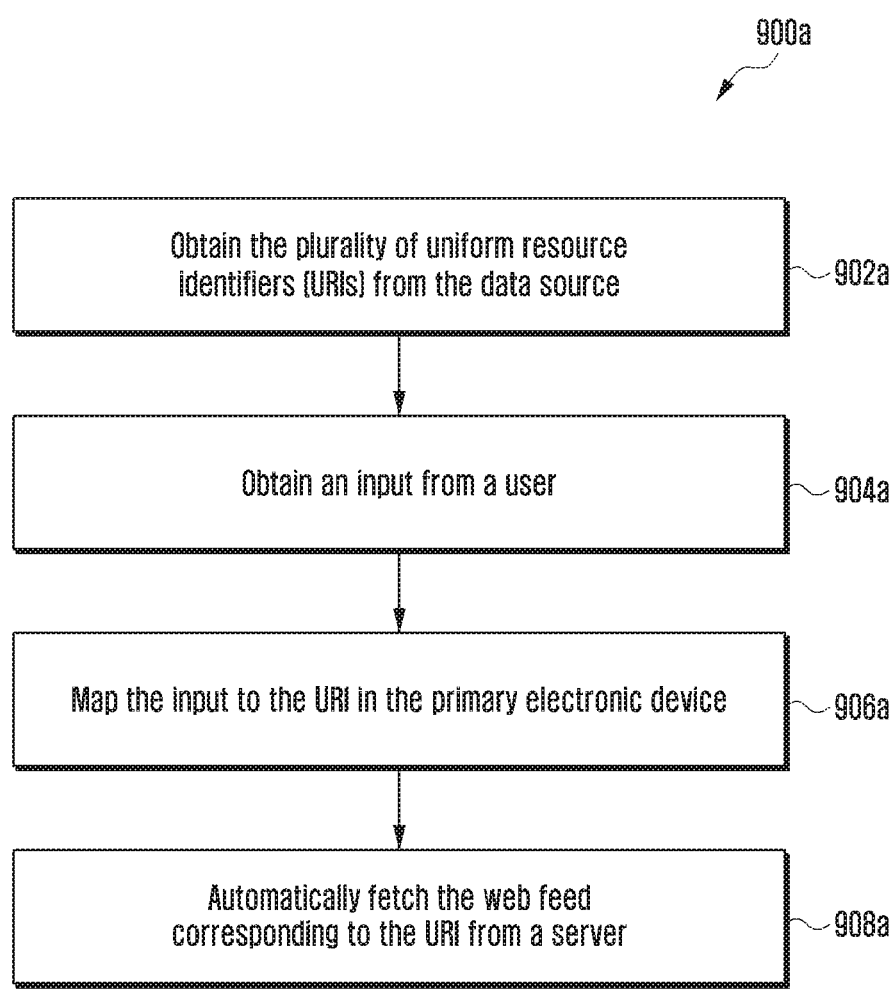
FIG. 9A is a flow diagram illustrating a method for providing the web feed corresponding to the URI based on an user input according to various embodiments of the present disclosure.

FIG. 9A is a flow diagram illustrating a method 900*a* for providing the web feed corresponding to the URI based on the user input according to various embodiments of the present disclosure.

Referring to FIG. 9A, at operation 902*a*, the method 900*a* includes obtaining the plurality of URIs from the data source. In an embodiment of the present disclosure, the method 900*a* allows the processing unit 202 to obtain the plurality of the URIs from the data source.

At operation 904*a*, the method 900*a* includes obtaining an input from the user. In an embodiment of the present disclosure, the method 900*a* allows the input unit 210 (e.g., voice recognition unit) to obtain the input from the user.

At operation 906*a*, the method 900*a* includes mapping the input to the URI in the electronic device 102. In an embodiment of the present disclosure, the method 900*a* allows the processing unit 202 to map the input to the URI in the electronic device 102. At operation 908*a*, the method 900*a* includes automatically fetching the web feed corresponding to the URI from the server 106. In an embodiment of the present disclosure, the method 900*a* allows the parsing unit 204 to automatically fetch the web feed corresponding to the URI from the server 106.

The various actions, acts, blocks, operations, and the like in method 900*a* may be performed in the order presented, in a different order or simultaneously. Further, in some embodiments of the present disclosure, some actions, acts, blocks, operations, and the like may be omitted, added, modified, skipped, and the like without departing from the scope of the present disclosure.

FIG. 9B is an example illustration for automatically fetching and displaying the content of the web feed on the wearable devices according to various embodiments of the present disclosure.

Referring to FIG. 9B, the input unit 210 receives the voice input from the user. Based on the voice input, the input unit 210 is configured to convert the voice input into the text input so as to map the text input to the URI in the electronic device 102. The parsing unit 204 is configured to automatically identify the web feed corresponding to the URI after receiving the user input.

The communication unit 208 is configured to transfer the web feed to the wearable device so that the wearable device displays the web feed either configured by the user or learnt by the past user behavior.

In an embodiment of the present disclosure, the wearable device is configured to allow the user to swipe the finger to switch between different web feeds. In an embodiment of the present disclosure, the wearable device is configured to display only the top few web feeds. In an embodiment of the present disclosure, the wearable device is configured to display the web feed by accessing the widget application.

In an embodiment of the present disclosure, the processing unit 202 of the electronic device 102 is configured to determine whether the web feed displayed on the electronic device 102 fits into the display area of the wearable device. On determining the web feed displayed on the electronic device 102 fits into the display area of the wearable device, the communication unit 208 is configured to transfer the web feed to the wearable device, such that the wearable device is configured to display the web feed.

In an embodiment of the present disclosure, the web feed is transferred from the primary electronic device 102a and displayed on the secondary electronic device 102b based on the user input (e.g., voice input). In an example, the web feed is transferred from the laptop and displayed on the smart phone based on the user input (e.g., voice input).

FIG. 10 is a flow diagram illustrating a method 1000 for providing the web feed by extracting channel information from the electronic device 102 according to various embodiments of the present disclosure.

Referring to FIG. 10, at operation 1002, the method 1000 includes obtaining the plurality of URIs from the data source. In an embodiment of the present disclosure, the method 1000 allows the processing unit 202 to obtain the plurality of URIs from the data source.

At operation 1004, the method 1000 includes detecting whether the user is watching the channel in the electronic device 102. In an embodiment of the present disclosure, the method 1000 allows the processing unit 202 to detect whether the user is watching the channel in the electronic device 102.

At operation 1006, the method 1000 includes obtaining a channel number of the channel by using an EPG. In an embodiment of the present disclosure, the method 1000 allows the processing unit 202 to obtain the channel number by using the EPG.

At operation 1008, the method 1000 includes mapping the channel number to the channel information using the digital document to identify the URI of the channel. In an embodiment of the present disclosure, the method 1000 allows the processing unit 202 to map the channel number to the channel information using the digital document to identify the URI of the channel.

At operation 1010, the method 1000 includes automatically fetching the web feed corresponding to the URI from the server 106. In an embodiment of the present disclosure, the method 1000 allows the parsing unit 204 to automatically fetch the web feed corresponding to the URI from the server 106.

The various actions, acts, blocks, operations, and the like in method 1000 may be performed in the order presented, in a different order or simultaneously. Further, in some embodiments of the present disclosure, some actions, acts, blocks, operations, and the like may be omitted, added, modified, skipped, and the like without departing from the scope of the present disclosure.

Figure 11:
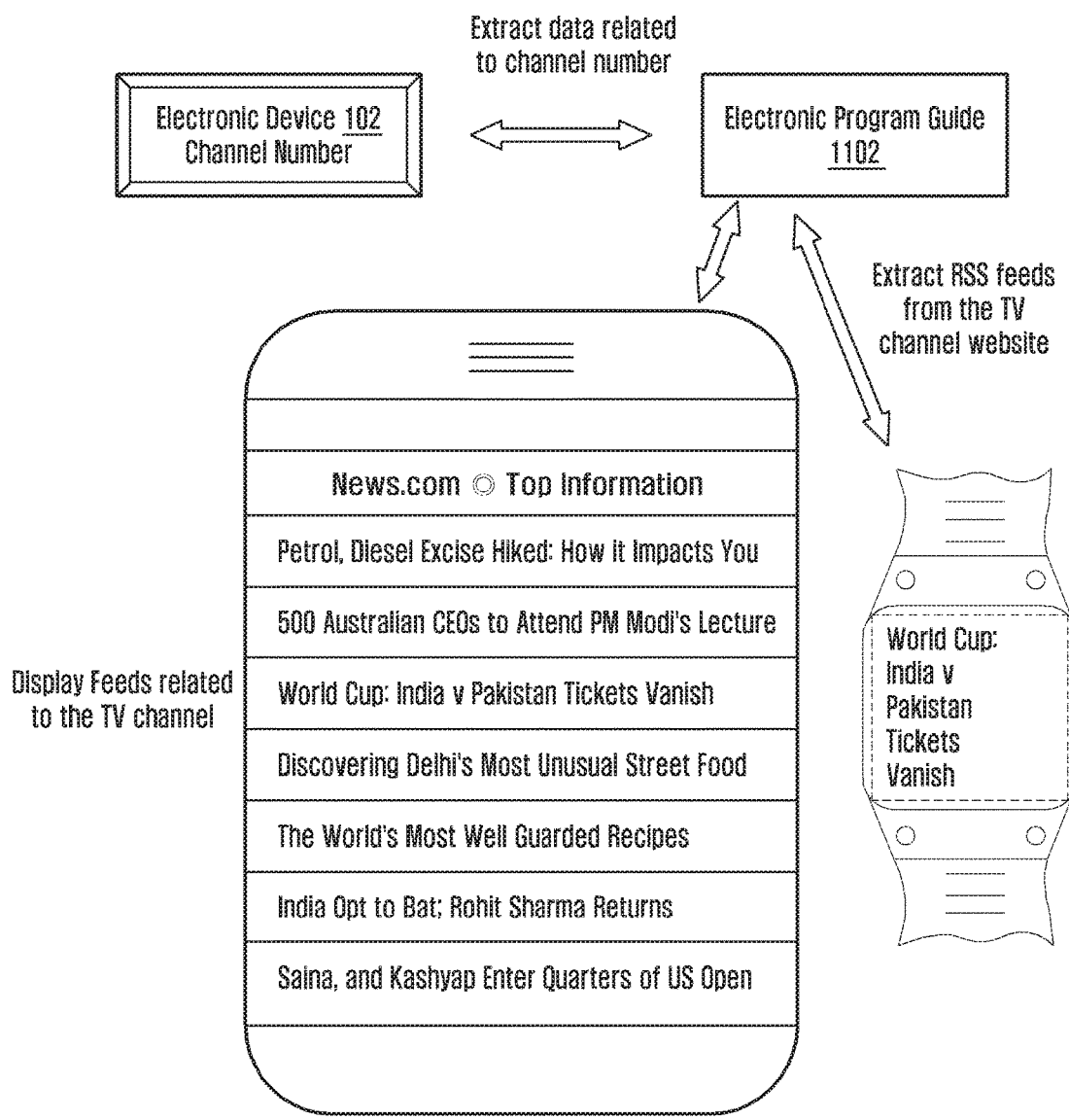
FIG. 11 is an example illustration for providing and displaying the web feed on the electronic device and the wearable device by extracting channel information of a channel watched by the user in the electronic device according to various embodiments of the present disclosure.

FIG. 11 is an example illustration for providing and displaying the web feed on the electronic device and the wearable device by extracting channel information of a channel watched by the user in the electronic device according to various embodiments of the present disclosure.

Referring to FIG. 11, the processing unit 202 is configured to detect whether the user is watching the channel in the electronic device 102. In an embodiment of the present disclosure, the electronic device 102 is the TV. The processing unit 202 is configured to obtain the channel number by using electronic program guide (EPG) 1102.

Based on the channel number information, the processing unit 202 is configured to map the channel number to the channel information using the EPG 1102 to identify the URI of the channel. Based on the mapping information, the parsing unit 204 is configured to automatically identify the web feed from the URI. The web feed is transferred from the electronic device 102 to the wearable device.

In an example, if the user is watching the sports channel in the TV, the processing unit 202 is configured to obtain the sports channel number by using the EPG 1102. Based on the sports channel number information, the processing unit 202 is configured to map the sports channel number to particular sports channel website information using the EPG 1102 to identify the URI of the sports channel. Based on the mapping information, the parsing unit 204 is configured to automatically identify the web feed from the URI of the sports channel. The web feed is sent to the electronic device 102 (e.g., smart phone). The web feed is transferred from the electronic device 102 to the smart watch.

In another example, the sports channel is running on the smart phone, the processing unit 202 is configured to obtain the sports channel number by using the EPG (e.g., internet protocol TV (IPTV) guide). Based on the sports channel number information, the processing unit 202 is configured to map the sports channel number to the particular sports channel website information using the EPG to identify the URI of the sports channel. Based on the mapping information, the parsing unit 204 is configured to automatically identify the web feed from the URL of the sports channel. The web feed is transferred from the electronic device 102 to the smart watch.

Figure 12:
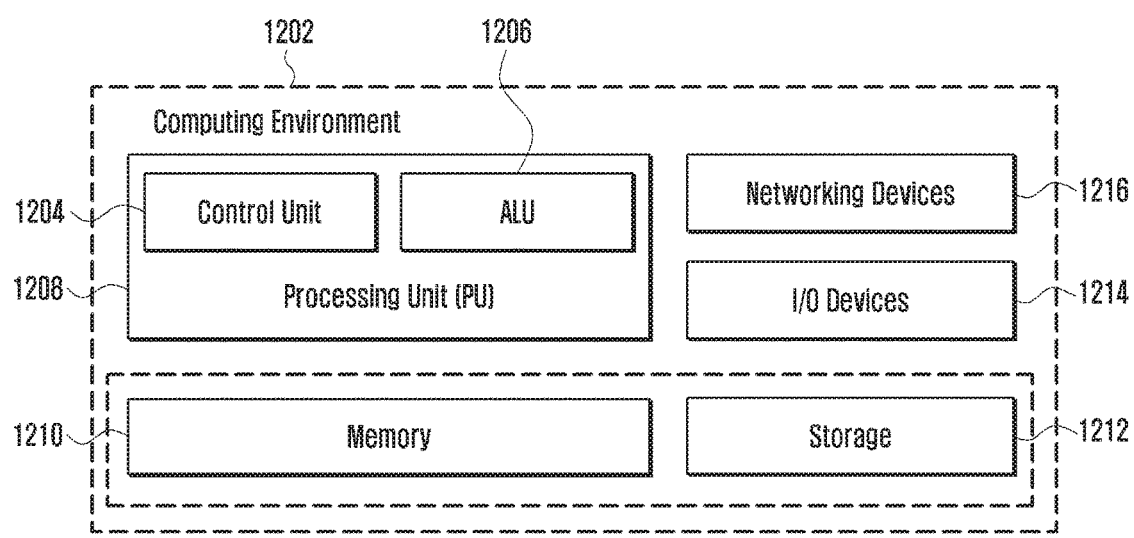
FIG. 12 illustrates a computing environment implementing a method and system of providing the web feed in the URI according to various embodiments of the present disclosure.

FIG. 12 illustrates a computing environment 1202 implementing a method and system of providing a web feed in the URI according to various embodiments of the present disclosure.

Referring to FIG. 12, the computing environment 1202 comprises at least one processing unit 1208 that is equipped with a control unit 1204, an arithmetic logic unit (ALU) 1206, a memory 1210, a storage 1212, a plurality of networking devices 1216 and a plurality of input output (I/O) devices 1214. The processing unit 1208 is responsible for processing the instructions of the algorithm. The processing unit 1208 receives commands from the control unit in order to perform its processing. Further, any logical and arithmetic operations involved in the execution of the instructions are computed with the help of the ALU 1206.

The overall computing environment 1202 can be composed of multiple homogeneous and/or heterogeneous cores, multiple central processing units (CPUs) of different kinds, special media and other accelerators. The processing unit 1208 is responsible for processing the instructions of the algorithm. Further, a plurality of processing units 1208 may be located on a single chip or over multiple chips.

The algorithm comprising of instructions and codes used for the implementation are stored in either the memory 1210 or the storage 1212 or both. At the time of execution, the instructions may be fetched from the corresponding memory 1210 and/or storage 1212, and executed by the processing unit 1208.

In case of any hardware implementations various networking devices 1216 or external I/O devices 1214 may be connected to the computing environment 1202 to support the implementation through the networking unit and the I/O device unit.

The various embodiments of the present disclosure can be implemented through at least one software program running on at least one hardware device and performing network management functions to control the elements. The elements shown in FIGS. 1A, 1B, 2, and 12 include blocks which can be at least one of a hardware device, or a combination of hardware device and software module While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing a web feed in a uniform resource identifier (URI), the method comprising:
   obtaining, by at least one processor of a first electronic device, at least one URI from at least one data source in a server;
   automatically fetching, by the at least one processor of the first electronic device, at least one web feed corresponding to the at least one URI, from the server; and
   providing the fetched at least one web feed to a second electronic device,
   wherein the fetching of the at least one web feed comprises:
      obtaining a channel number of a channel being watched in the first electronic device,
      identifying channel information for the channel number using a digital document to identify the at least one URI for the channel, and
      automatically fetching the at least one web feed corresponding to the at least one URI from the server.

2. The method of claim 1, wherein the fetched at least one web feed is provided to the second electronic device by a communication interface of the first electronic device.

3. The method of claim 1, further comprising:
   automatically fetching the at least one web feed based on a display area of the second electronic device, the second electronic device comprising a wearable device.

4. The method of claim 1, wherein the automatic fetching of the at least one web feed comprises:
   obtaining an input from a user;
   mapping the input to the at least one URI; and
   automatically fetching the at least one web feed corresponding to the at least one URI.

5. The method of claim 1, further comprising:
   automatically fetching the at least one web feed based on the at least one URI being marked for offline reading;
   determining whether a data connection is available to retrieve content from the at least one URI; and
   retrieving the content in response to determining that the data connection is available.

6. The method of claim 1, further comprising indicating the at least one web feed in the first electronic device.

7. The method of claim 1, wherein the at least one web feed is indicated by prioritizing the at least one URI.

8. The method of claim 1, further comprising:
   periodically monitoring the at least one URI;
   determining whether a new web feed is available in the at least one URI; and
   indicating the new web feed to a user.

9. The method of claim 1, further comprising:
   periodically monitoring the at least one data source;
   determining whether a new URI is available in the at least one data source; and
   automatically identifying the at least one web feed corresponding to the new URI.

10. A first electronic device for providing a web feed in a uniform resource identifier (URI), the first electronic device comprising:
    at least one processor configured to:
       obtain at least one URI from at least one data source in a server,
       automatically fetch at least one web feed corresponding to the at least one URI, from the server, and
       provide the fetched at least one web feed to a second electronic device,
    wherein the at least one processor is configured to fetch the at least one web feed by:
       obtaining a channel number of a channel being watched in the first electronic device;
       identifying channel information for the channel number using a digital document to identify the at least one URI for the channel; and
       automatically fetch the at least one web feed corresponding to the at least one URI from the server.

11. The first electronic device of claim 10, wherein the fetched at least one web feed is provided to the second electronic device by a communication interface of the first electronic device.

12. The first electronic device of claim 11, wherein the at least one processor is further configured to:
    automatically fetch the at least one web feed based on a display area of the second electronic device, the second electronic device comprising a wearable device, and
    transfer, by the communication interface, the fetched at least one web feed to the wearable device from the first electronic device.

13. The first electronic device of claim 10, wherein the at least one processor is further configured to automatically fetch the at least one web feed by:
    obtaining an input from a user,
    mapping the input to the at least one URI, and
    automatically fetching the at least one web feed corresponding to the at least one URI.

14. The first electronic device of claim 10, wherein the at least one processor is further configured to:
    automatically select the at least one web feed based on the at least one URI being marked for offline reading,
    determine whether a data connection is available to retrieve content from the at least one URI, and
    retrieve the content in response to determining that the data connection is available.

15. The first electronic device of claim 10, wherein the at least one processor is further configured to indicate the at least one web feed corresponds to the at least one URI.

16. The first electronic device of claim 10, wherein the at least one web feed is indicated by prioritizing the at least one URI.

17. The first electronic device of claim 10, wherein the at least one processor is further configured to:
  periodically monitor the at least one URI,
  determine whether a new web feed is available from the at least one URI, and
  indicate the new web feed to the user.

18. The first electronic device of claim 10, wherein the at least one processor is further configured to:
  periodically monitor the at least one data source;
  determine whether a new URI is available in the at least one data source, and
  automatically identify the at least one web feed corresponding to the new URI.

* * * * *